UNITED STATES PATENT OFFICE 2,584,508

PRODUCTION OF COMPOUNDS OF ALGINIC ACID AND ITS DERIVATIVES

John Bamber Speakman and Norman Henry Chamberlain, Leeds, and Catherine Margaret Cameron Dorkin, York, England, assignors to Alginate Industries Limited, London, England, a British company No Drawing. Application April 22, 1948, Serial No. 22,698. In Great Britain April 2, 1947

7 Claims. (Cl. 260—209.6)

This invention comprises improvements in or relating to the production of compounds of alginic acid and its derivatives.

When a solution of sodium alginate is extruded into a solution of sulphuric acid, sodium sulphate, emulsified oil and a cation-active detergent, films or filaments of alginic acid are obtained. Similarly, when a solution of sodium alginate is extruded into a weakly-acid solution of calcium chloride, containing emulsified oil, films or filaments of calcium alginate are obtained. Although both alginic acid and calcium alginate yarns have found a number of special uses in the textile industry, they are unsuitable for ordinary uses because of their ready solubility in dilute solutions of soap and soda, such as are commonly used in the laundering of textile materials. This disadvantage of alkali-solubility is shared by all the metal alginates, except those containing metals of high co-ordinating power, e. g. chromium and beryllium. Chromium alginate, however, is coloured and beryllium alginate is rather brittle, so attention has been turned to cross-linking agents other than co-ordinating metals as possible means of conferring alkali-resistance on films and filaments derived from alginic acid. In British Patent Specification No. 575,611 there is described a process of treating alginic acid and its derivatives with urea and formaldehyde in order to render it alkali-resistant and in British Patent Specification No. 5188/47 there is described a process of treatment with hexylene dioxide for a similar purpose.

It is an object of the present invention to provide a process for the production of alkali-resistant alginic acid derivatives, whether in the form of films and filaments or in powder or other form, for example for use in the manufacture of plastics or for other purposes.

According to the present invention, a process for the production of alkali-resistant alginic acid derivatives comprises reacting alginic acid or a derivative thereof with a diisocyanate so as to produce cross-linkages of the hydroxyl groups therewith such that the product is more resistant to alkali than the initial alginic material.

Hydroxyl groups are known to react with isocyanates as follows:

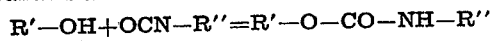

By treating alginic acid and its derivatives with diisocyanates it was hoped to cross-link neighbouring alginic acid chains through their hydroxyl groups according to the following equation:

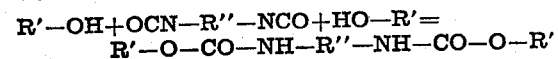

where R' represents an alginic acid chain.

It has been found that such a reaction can be effected under suitable conditions of treatment. When dry, the molecular structure of alginic acid and the alginates is so compact that the hydroxyl groups are inaccessible to the molecules of diisocyanate. If the alginic acid or alginate is swollen with water, the hydroxyl groups are accessible but the diisocyanate reacts with the water. To overcome these difficulties the alginic acid or alginate may be first swollen in water, the water then displaced by a polar solvent, for example methanol, which maintains sufficient swelling to keep the hydroxyl groups accessible, and, after removing excess methanol, cross-linking may be brought about by treatment with a solution of diisocyanate, in non-reactive polar solvents such as acetone or methyl ethyl ketone.

Unlike those produced from its metallic salts, compounds of alginic acid produced by the above process are not fire-proof, but by further causing them to react with metallic salts, such as calcium, chromium or beryllium acetate, whereby linkages are created with the carboxyl groups of the alginic acid, materials can be obtained which are not only alkali-resistant but also fire-resistant.

In view of the fact that alginates cross-linked with diisocyanates in accordance with the present invention have free carboxyl groups, they can be used, if desired, as ion exchange materials and such use is within the scope of the present invention.

The following are examples of treatment in accordance with the present invention:

Example I

A hank of calcium alginate yarn was wetted out in water and then freed from water by immersion in three changes of methanol over a period of 3 hours. The hank was then centrifuged and boiled for 24 hours under reflux in 40 volumes of a 2.5% (by weight) solution of hexamethylene diisocyanate in acetone. After extraction with acetone to remove uncombined diisocyanate the hank was re-conditioned at 65% relative and 72° F. and re-weighed. The gain in weight due to the treatment with diisocyanate was 10.4%.

When treated with a solution of soap (0.2%) and soda (0.2%) for 24 hours at room temperature the yarn was undissolved and the loss in weight was only 2.3%. Yarn which had been given the same treatment, except that diisocyanate was omitted in the final stage, dissolved completely in less than 1 hour. The diisocyanate-treated yarn was also undissolved after treatment with the solution of soap and soda for 72 hours at 60° C., or for 1 hour at the boil.

The bulk of the water should be removed from the solvents used in the above treatment, but traces of water must be present. Rigid exclusion of water causes less reaction with the diisocyanate and a lower resistance to alkali.

*Example II*

In this case the hank of calcium alginate yarn was treated in the same way as Example I, except that a 2.5% (by weight) solution of hexamethylene diisocyanate in methyl ethyl ketone, instead of in acetone, was used in the final stage. The gain in weight of the hank was 7.5%. Its resistance to attack and dissolution by the aforesaid solution of soap and soda was good, but slightly less than that of the hank which had been treated with a solution of hexamethylene diisocyanate in acetone.

*Example III*

Calcium alginate yarn was soaked in water and then freed from water by immersion in three changes of methanol as described in Example I. It was then boiled for 24 hours with 100 volumes of a 2% solution of hexamethylene diisocyanate in acetone in a reflux condenser. After extraction with alcohol and ether to remove uncombined diisocyanate and polymerisation products, the gain in dry weight was 12.6%.

The regain (water absorption capacity) at 65% R. H. and 22.2° C. is not altered to any significant extent by the above treatment:

|  | Per cent regain |
|---|---|
| Untreated yarn | 28.5 |
| Treated yarn | 26.5 |

This yarn showed a high resistance to the attack of alkali, although not so high as that set forth in Example I. Treatment for 24 hours at 22.2° C. with a solution consisting of soap (0.2%) and soda (0.2%) showed 16% by weight of the yarn to be dissolved. In 1 hour at 100° C. with the same solution not more than 25% of the yarn was dissolved.

Although in the above examples only hexamethylene diisocyanate is given as an example of the diisocyanate, indications are that other diisocyanates behave similarly provided the two reactive isocyanate groups in the compound are separated by a chain long enough to allow cross-linking with the alginate to take place.

We claim:

1. A process for the production of alkali-resistant alginic material, which comprises first swelling in water alginic material of the group consisting of alginic acid and water-insoluble metal alginates, then displacing the water by a polar solvent which maintains sufficient swelling to keep the hydroxyl groups accessible, and thereafter bringing about cross-linking by treatment with a solution of hexamethylene diisocyanate in a non-reactive polar solvent.

2. A process for the production of alkali-resistant alginic material, which comprises first swelling in water alginic material of the group consisting of alginic acid and calcium alginate, then displacing the water by a polar solvent which maintains sufficient swelling to keep the hydroxyl groups accessible, and thereafter bringing about cross-linking by treatment with a solution of hexamethylene diisocyanate in a non-reactive polar solvent.

3. A process as claimed in claim 1 wherein the polar solvent by which the water is displaced is methanol.

4. A process as claimed in claim 1 wherein the non-reactive polar solvent is a water-soluble ketone.

5. A process as claimed in claim 1 wherein the non-reactive polar solvent is acetone.

6. A process as claimed in claim 1 wherein the non-reactive polar solvent is methyl ethyl ketone.

7. A process for the production of alkali-resistant alginic material, which comprises swelling calcium alginate in water, then displacing the water by a polar solvent which maintains sufficient swelling to keep the hydroxyl groups accessible, and thereafter bringing about cross-linking by treatment with a solution of hexamethylene diisocyanate in a non-reactive polar solvent.

JOHN BAMBER SPEAKMAN.
NORMAN HENRY CHAMBERLAIN.
CATHERINE MARGARET
            CAMERON DORKIN.

REFERENCES CITED

The following references are of record in the file of this patent:

UNITED STATES PATENTS

| Number | Name | Date |
|---|---|---|
| 2,266,777 | Lieser | Dec. 23, 1941 |
| 2,284,896 | Hanford et al. | June 2, 1942 |
| 2,317,492 | Speakman et al. | Apr. 27, 1943 |
| 2,319,168 | Speakman et al. | May 11, 1943 |
| 2,339,913 | Hanford et al. | Jan. 25, 1944 |
| 2,374,136 | Rothrock | Apr. 17, 1945 |
| 2,403,707 | Cunningham et al. | July 9, 1946 |
| 2,409,319 | Speakman et al. | Oct. 15, 1946 |